United States Patent [19]

Stoughton et al.

[11] Patent Number: 4,762,016

[45] Date of Patent: Aug. 9, 1988

[54] ROBOTIC MANIPULATOR HAVING THREE DEGREES OF FREEDOM

[75] Inventors: Robert Stoughton; Theodore Kokkinis, both of Goleta, Calif.

[73] Assignee: The Regents of the University of California, Berkeley, Calif.

[21] Appl. No.: 31,504

[22] Filed: Mar. 27, 1987

[51] Int. Cl.[4] ...................... B25J 18/00; G05G 11/00
[52] U.S. Cl. .................................. 74/479; 74/665 C; 74/675; 414/680; 901/15; 901/26
[58] Field of Search ...................... 74/479, 665 C, 675; 901/15, 18, 23, 24, 26, 28; 414/680, 729

[56] References Cited

U.S. PATENT DOCUMENTS

| | | | |
|---|---|---|---|
| 2,286,571 | 6/1942 | Pollard | 901/23 X |
| 2,992,563 | 7/1961 | Lassen | 74/675 X |
| 3,386,694 | 6/1968 | Boyle | 74/675 X |
| 4,329,110 | 5/1982 | Schmid | 901/15 X |
| 4,407,625 | 10/1983 | Shum | 901/23 X |
| 4,425,818 | 1/1984 | Asada et al. | 74/469 |

FOREIGN PATENT DOCUMENTS

| | | | |
|---|---|---|---|
| 2143498 | 2/1985 | United Kingdom | 901/18 |
| 2171074 | 8/1986 | United Kingdom | 901/18 |

OTHER PUBLICATIONS

Edited by Hideo Hanafusa & Hirochika Inoue, Robotics Research, The Second International Symposium, 1985, by The Massachusetts Institute of Technology, The MIT Press, Cambridge, Massachusetts, London, England, Papers presented at 2nd Int'l Symp. on Robotics in Kyoto, Japan, '84.

H. A. Pak, Assist. Prof. & P. J. Turner, Grad. Student, Optimal Tracking Controller Design for Invariant Dynamics Direct-Drive Arms, Dept. of Mech. Engineering, University of Southern California, University Park, Los Angeles, CA 90089-1453, pp. 1-8, Mech. Eng. Dept., Imperial College of Science & Technology, London, England.

Robert Stoughton and Theodore Kokkinis, A New 3-DOF Mechanism for Quasi-Direct-Drive Robot Manipulators, pp. 1-6, University of California, Santa Barbara, Santa Barbara, CA 93106 (Stoughton w/Mech. Eng. Dept. & Kokkinis w/Ctr. for Robotic Systems in Microelectronics), NSF Contract Number 08421415.

Atul Bajpai of General Motors Technical Ctr. Warren, Michigan 48090 and Bernard Roth of the Dept. of Mech. Eng., Stanford University, CA 94305, Workspace and Mobility of a Closed-Loop Manipulator, pp. 131-142, The International Journal of Robotics Research, Summer 1986, The Mass. Inst. of Tech.

Donald Schmitz, Pradeep Khosla, Takeo Kanade, Robotics Institute, Carnegie-Mellon University, Pittsburgh, Pa. 15213, 15th ISIR, pp. 471-478, Development of CMU Direct-Drive Arm II.

K. H. Hunt; Prof. of Mechanism, Dept. of Mech. Engr., Monash Univ., Clayton Victoria, Australia, Structural Kinematics of In-Parallel-Actuated Robot-Arms, Journal of Mechanisms, Transmissions, and Automation in Design, Dec. 1983, vol. 105, pp. 705-712, Transactions of the ASME.

Koichi Sugimoto; Sr. Researcher, Prod. Engrg. Research Lab., Hitachi Ltd., Japan, Kinematic and Dynamic Analysis of Parallel Manipulators by Means of Motor Algebra, The American Society of Mechanical Engineers, 345 E. 47th Street, New York, N.Y., 10017 ASME #86-DET-130, rcv'd Jul. 1, 1986, total pages 5.

C. F. Earl; Research Fellow and J. Rooney; Lecturer, (List continued on next page.)

*Primary Examiner*—Allan D. Herrmann
*Attorney, Agent, or Firm*—Ciotti & Murashige, Irell & Manella

[57] ABSTRACT

A robotic manipulator provides three degrees of freedom of movement of an end effector or gripper using only motors which are mounted on a frame. Included is a first actuator assembly providing rotation of a first input link about first and second axes. A compound motor provides this rotation about two axes through a differential gear mechanism. A second actuator provides rotation of a second input link about a third axis. The two input links are each connected to an output link, which in turn are connected, with an end effector being disposed on the end of one of the output links.

12 Claims, 3 Drawing Sheets

OTHER PUBLICATIONS

Faculty of Tech., Open Univ., Milton Keynes, U.K., Some Kinematic Structures for Robot Manipulator Designs, Journal of Mechanisms, Transmissions, and Automation in Design, Mar. 1983, vol. 105, pp. 15–22, rcv'd ASME Headquarters Jun. 11, 1982, Paper #82-DET-89.

Youcef-Toumi, K. and Asada, H.; Mass. Inst. of Tech., Dept. of Mech. Engrg. & Lab. for Manufacturing and Productivity, Cambridge, Mass 02139, Design and Control of Direct-Drive Arms, Proceedings of the 1985 American Control Conference, Jun. 19–21, 1985, Sponsored by AACC., pp. 696–702, Identifier #TA2-8:30 top lefthand.

Haruhiko Asada; Assoc. Prof. and II Hwan Ro; Grad. Student, A Linkage Design for Direct-Drive Robot Arms, Journal of Mechanisms, Transmissions, and Automation in Design, Dec. 1985, vol. 107, pp. 536–540, Authors from Dept. of Mech. Eng., Lab for Manufacturing & Productivity, Massachusetts Inst. of Tech., Cambridge.

H. Asada, T. Kanada and I. Takeyama; Control of a Direct-Drive Arm[1], Transactionsof the ASME, Journal of Dynamic Systems, Measurement, and Control, Sep. 1983, vol. 105, pp. 136–142, Work supported by The Office of Naval Research, Contract #N00014-8-1-K-0503.

W. R. Hamel and H. L. Martin, Robotics-Related Technology in the Nuclear Industry, Research Sponsored by the Office of Spent Fuel Management & Reprocessing Systems, U.S. Dept. of Energy, Contract #W-7405-Eng-26, Proc. of SPIE, vol. 442, Robotics & Robot Sensing Systems, Aug. 25,1983, pp. 97–107.

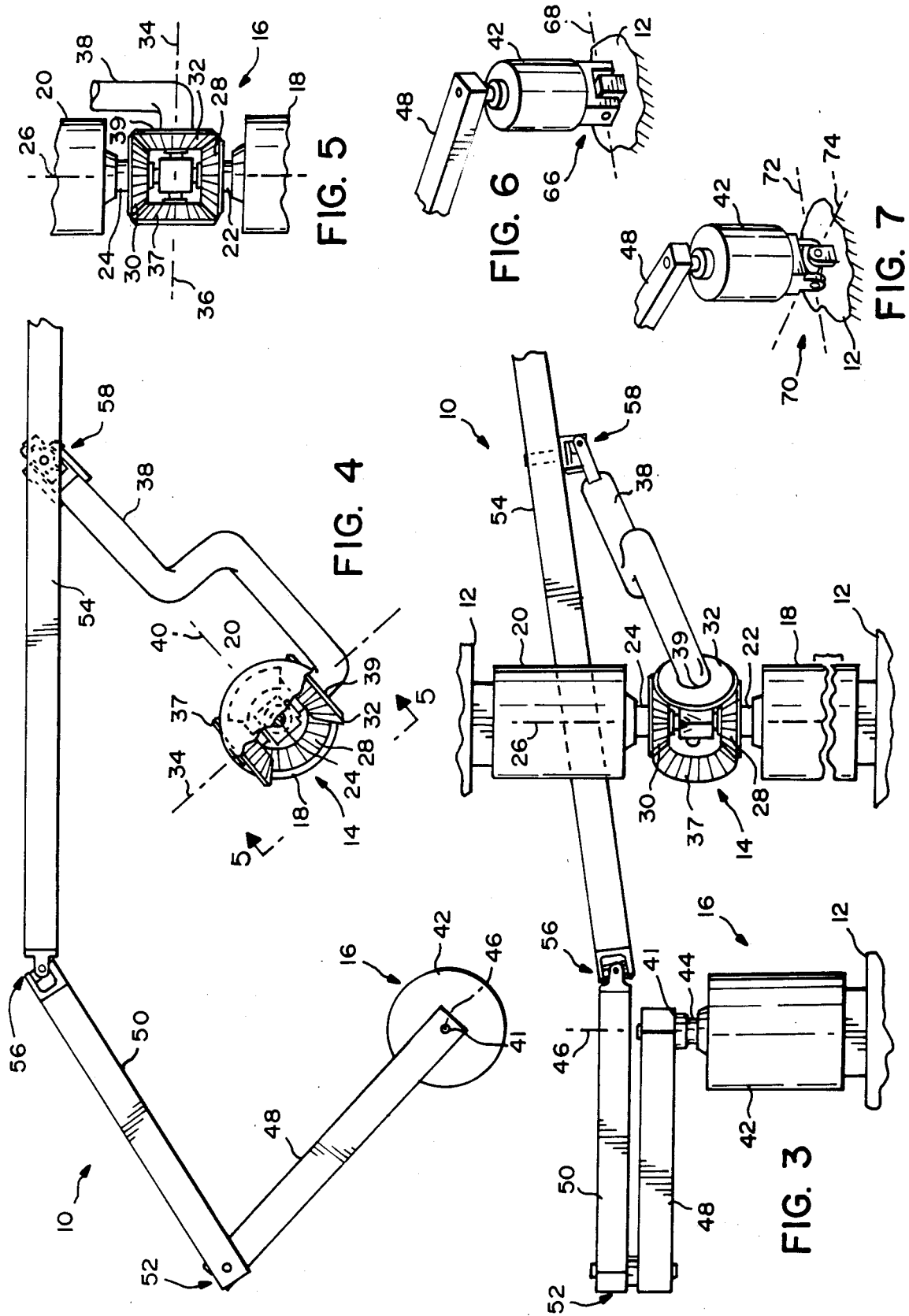

ROBOTIC MANIPULATOR HAVING THREE DEGREES OF FREEDOM

This invention was made with Government support under Grant Contract No.: CDR 84-21415, awarded by the National Science Foundation. The Government has certain rights in this invention.

BACKGROUND AND SUMMARY OF THE INVENTION

This invention relates to robotic manipulators, and more particularly, to such manipulators having drive actuators attached to a base and providing movement of an end effector with three degrees of freedom (DOF).

Typical industrial robots having several degrees of freedom have actuators distributed at the joints. This eliminates much of the mechanical transmission resulting in simpler, more accurate design. Electric motors, the most commonly used actuators, are by their nature very heavy, and thus comprise a sizable percentage of the overall structural weight of the robot arm.

Distributing the motors at the joints places them in high inertial positions, and their masses become inertial loads on some of the other motors. The majority of mechanical work done by some robots is accelerating and decelerating the motors on the manipulator arms.

Modern teleoperator designs centralize the actuators in a low inertial position. This reduces the inertia and coupling forces on the joints, resulting in a quicker manipulator with improved control performance. The torque is transmitted via cables, metal tapes, back drivable gear trains and/or torque tubes. These transmission methods are inaccurate due to low mechanical stiffness and backlash, but have relatively little friction. Accuracy, while crucial in autonomous robots, is relatively unimportant in teleoperators due to the existence of a person in the control loop.

The recent emergence of direct-drive technology in robot design underscores ever increasing accuracy requirements of robots. Unfortunately direct drive servomotors with high output torques are heavier still than an equivalent gear motor. As a result, a serial link direct-drive manipulator, such as the one disclosed in Asada, et al, "Control of a Direct-Drive Arm" *ASME J. Dyn. Sys., Meas. and Control*, Vol. 105, September 1983, has a very massive structure.

Work has been done more recently on in-parallel actuated kinematic structures, including arms with up to three to six DOF. These structures have the potential of greatly improving the mechanical performance of modern robots. Before this can be accomplished, a more detailed kinematic analysis of specific linkages must be carried out, with the goal of developing a practical engineering design. It is unfortunate that linkages which have such potential advantages also have extremely complex geometries for which few kinematic algorithms have yet been proposed. The geometric relationships between joint space and cartesian end effector space, the Jacobian relationships and the location and nature of singularities must be studied before a new design can realize its potential advantages.

By transmitting torque via a linkage which can be very stiff, the accuracy of direct drive is preserved. Additionally, links can be selected so as to provide a "gear reduction", that is, reduce speeds and amplify torques. A planar five-link linkage having simple kinematics has been analyzed thoroughly. The principle disadvantage of the design is that it only provides 2 DOF. This linkage is described by Asada, et al., in "Analysis and Design of a Direct-Drive Arm with a Five-Bar-Link Parallel Drive Mechanism", *ASME J. Dyn. Sys., Meas. & Control*, Vol. 106, No. 3, (September 1984) and in "A Linkage Designed for Direct-Drive Robot Arms," *ASME J. Mech. Trans.*, Vol. 107, December 1985. The addition of a third DOF is achieved by placing the entire mechanism on a rotating base, which is itself directly driven. With this design, the dynamics of the five-bar linkage can be completely decoupled resulting in improved control performance. However, the base rotation will always be dynamically coupled, and the advantages of fixed motors are reduced, as the 2 DOF mechanism becomes an inertial load on the base actuator. Another approach is to have the five-bar linkage move in a horizontal plane and place a small motor at the manipulator tip for vertical motion. This has the advantage of simplicity, and is considerably more compact than the large rotating base, but again reduces the advantage of fixed motors.

The present invention overcomes many of the described disadvantages of the known devices and designs. In particular, the present invention provides a 3 DOF closed-chain kinematic structure particularly well suited to robot manipulators. This structure has geometric and Jacobian relationships which are much more simple than other parallel actuated spatial structures with three or more DOF. Further, the present invention provides such a device having a large work space volume with singularities which can be restricted to the boundary of the work space.

The present invention generally provides the use of a spatial extension of the planar five-bar linkage by applying a differential-type input to one of the input links of the structure. This differential-type input uses two actuators to actively control a 2 DOF input link. A second single-DOF actuator is connected to another input link, with each of the input links being respectively connected to a separate output link. The output links are then connected together, with an end effector or gripper being associated with one of the output links. In the preferred embodiment, the three actuators are fixedly attached to a base and the input link connected to the 2 DOF actuator is connected to the corresponding output link by the equivalent of a ball joint, the other end of which output link is connected to the other output link by a universal joint. Finally, the remaining joint between an input and an output link is a single DOF pin joint. In alternative embodiments, these joints and actuators may be varied in configuration.

It will be seen that such a manipulator made according to the present invention provides the features and advantages described. Further, the present invention provides a structure which can achieve speeds and accuracies unattainable with similar serial link designs. Other features and advantages of the present invention will be realized from a consideration of the drawings and the following detailed description of the preferred embodiments.

BRIEF DESCRIPTION OF THE DRAWINGS

FIG. 3 is a partial fragmentary, side elevation of the manipulator of FIG. 1;

FIG. 4 is a plan view of the manipulator of FIG. 3;

FIG. 5 is a fragmentary elevation of a 2 DOF actuator assembly included in the manipulator of FIG. 1;

FIG. 6 is a partial fragmentary perspective of one of the motors of FIG. 3 shown with an alternative mounting;

FIG. 7 is a view similar to FIG. 6 showing yet another mounting; and

DETAILED DESCRIPTION OF THE PREFERRED EMBODIMENTS

Figure 1:
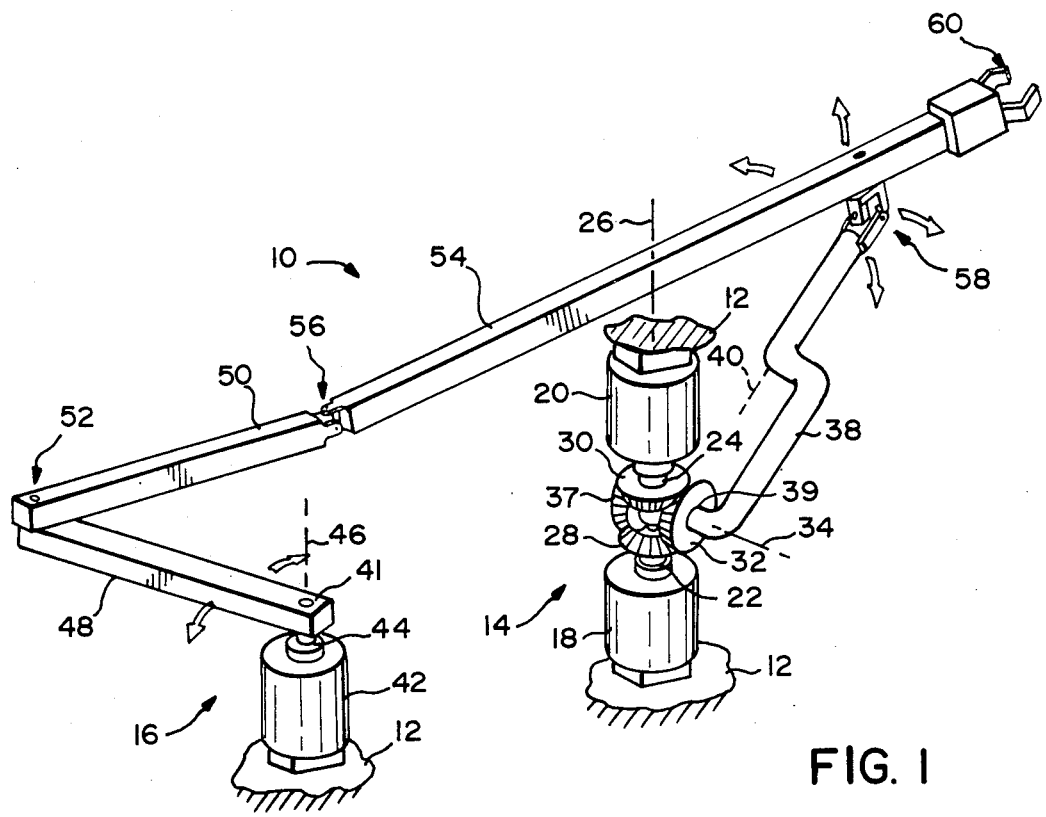
FIGS. 1 and 2 are perspectives of a robotic manipulator in different operational positions and made according to the present invention.

Referring initially to FIGS. 1–5, a robotic manipulator, shown generally at 10, made according to the present invention is illustrated. Manipulator 10 includes a frame or base 12 on which first and second actuator assemblies 14, 16 are mounted. Assembly 14 uses a pitch-yaw differential gear. It includes first and second motors 18, 20 fixedly mounted on base 12 with respective drive shafts 22, 24 which are coaxial about an axis of rotation 26. Shafts 22, 24 are connected to like bevel gears 28, 30, respectively. These gears mesh with a third bevel gear 32 which rotates about another axis of rotation 34 when gears 28, 30 rotate at the same speed in opposite directions about axis 26. Gear 32 is attached to an idler gear 37 which engages the other side of gears 28, 30, as seen particularly in FIGS. 3 and 4. However, as the gears 28, 30 rotate at at the same speed in the same direction, then gear 32 is caused to also revolve around axis 26 on gears 28, 30. Gear 32 is can thus be caused to rotate with 2 degrees of freedom. It is fixedly attached at a first joint 39 to a first input manipulator arm link 38 the distal end of which is formed to extend along an axis 40 perpendicular to axis 34 and intersecting axis 26. Axes 26 and 34 are also referred to herein as first and second axes, respectively.

Actuator assembly 16 comprises a motor 42, which in this preferred embodiment is fixedly mounted to base 12. Motor 42 has a drive shaft 44 which rotates about a vertical axis 46, also referred to herein as a third axis. Shaft 44 is rigidly connected at a second joint 41 to an end of a second input horizontal link 48. Connected to the other end of link 48 is a second output link 50, which is coupled to link 48 by a pin joint 52 which provides relative rotation between the links about a vertical axis.

Link 50 is connected at its other end to an end of a first output link 54 via a universal, 2 DOF joint 56. Joint 56 preferably provides for rotation of link 54 relative to link 50 about a vertical axis as well as a horizontal axis orthogonal to the length of link 54.

Figure 2:
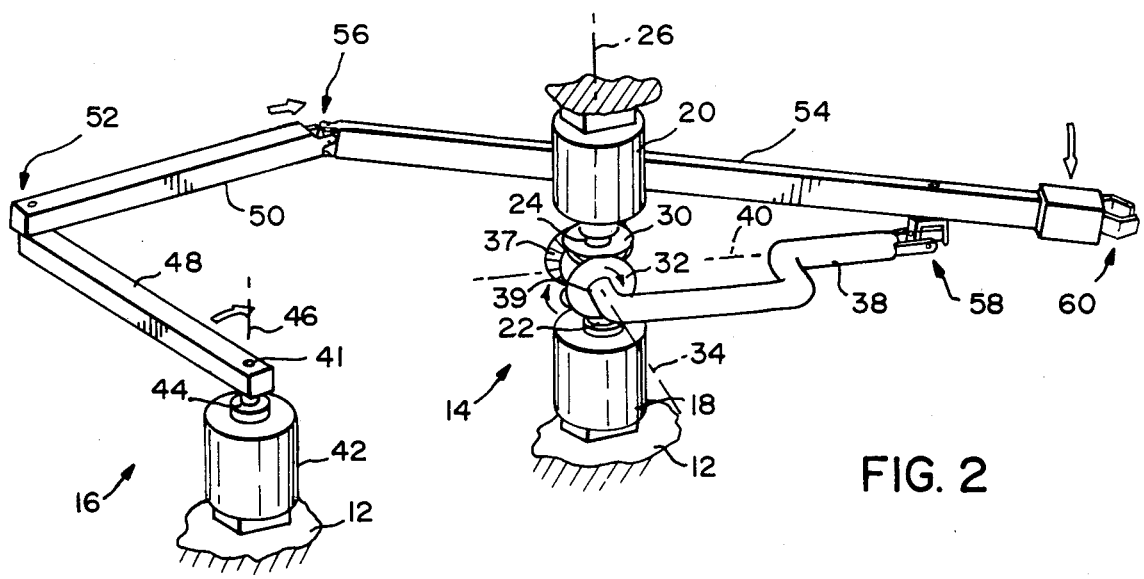

Link 38 is also connected to link 54, but at a point intermediate its ends at a joint 58 which in this preferred embodiment is a 3 DOF joint, such as provided by a ball joint, or as shown, by a universal joint with a pin joint having a third orthogonal axis of rotation. At the distal end of link 54 is an end effector or gripper 60 used to provide the desired gripping of a workpiece. As can be seen by FIGS. 1 and 2, control of motors 18, 20 provide for movement of gripper 60 vertically as well as horizontally. Joints 58, 52, and 56 are also referred to herein as third, fourth and fifth joints, respectively.

Referring specifically to FIG. 5, the structural detail of actuator assembly 14 is shown. This embodiment provides for fixedly mounting motors 18, 20 to base 12. However, the same two 2 DOF can be provided by mounting motor 20 onto the drive shaft of motor 18 so that rotation of shaft 22 rotates motor 20. Drive shaft 24 is then positioned to rotate orthogonally about an axis perpendicular to the axis of rotation of motor 18, with link 38 being attached to shaft 24. However, this results in the inertia of motor 20 being controlled by motor 18, thereby reducing its accuracy and effectiveness.

Alternative arrangements for joints 52, 56, 58 are possible while maintaining actuator assemblies 14, 16 fixed to base 12. In the embodiment shown, these joints must provide a total of 12 constraints of degrees of freedom to result in a net of 3 DOF for manipulator 10. This is determined from the Grubler relationship which expresses the number of DOF of a mechanism as a function of the number of links and the number of constraints in each joint:

No. DOF=6 (No. links−1) minus the sum of the constraints at each joint.

The joints defined by the motors on base 12 represent the constraints on the actively controlled input links. Since in general, a link has 6 DOF in space (three translation, three rotation), the 2 DOF and 1 DOF inputs, as defined by actuator assemblies 14, 16 and the ground link between them, constrain 4 DOF and 5 DOF, respectively.

It will be seen that the possible combinations for joints 52, 56, 58 may take on various arrangements of joint types and still provide a resultant three degress of freedom of movement of gripper 60. That is to say, joint 52 could be a 3 DOF joint, joint 56 could be a 1 DOF joint, and joint 58 could be a 2 DOF joint. As a comparison to relate to the embodiment shown in FIGS. 1–4, a study was made using a manipulator like manipulator 10 except with the form of joints in joints 56 and 58 exchanged. Joint 56 was a 3 DOF joint and joint 58 was a 2 DOF joint.

Figure 8:
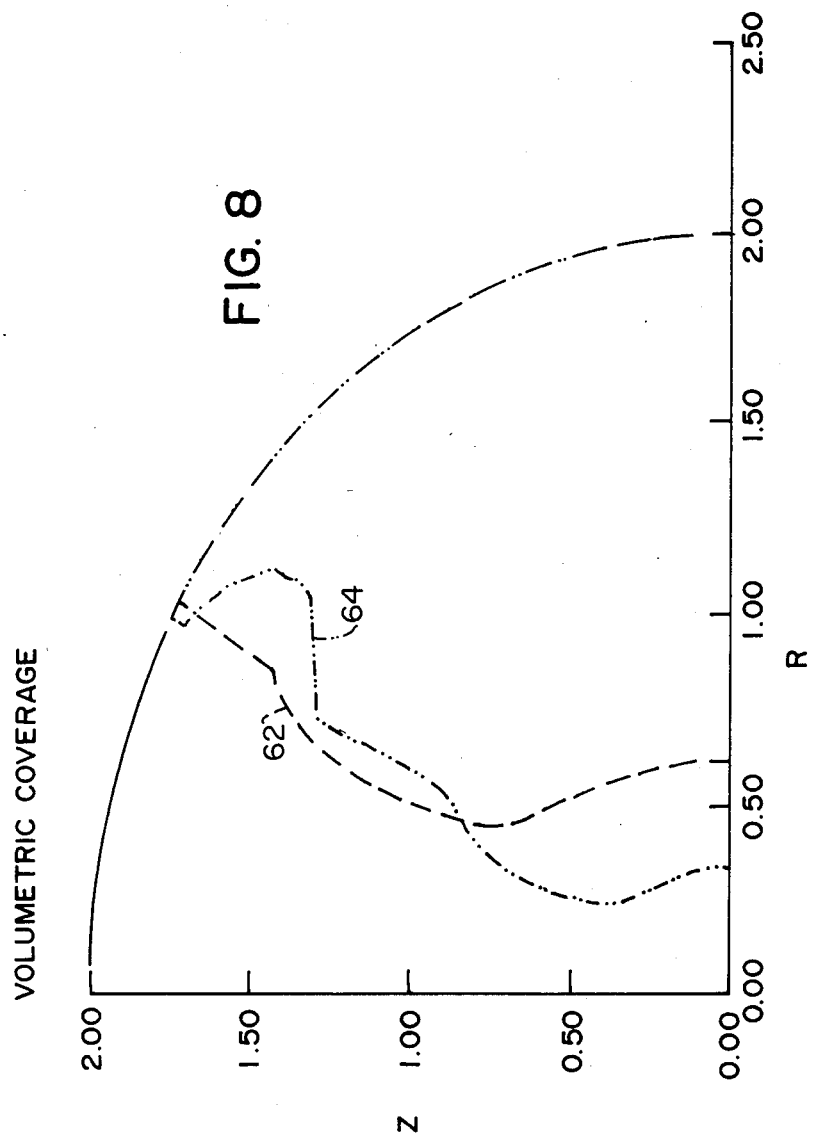
FIG. 8 is a plot representative of the volumetric coverage of two embodiments made according to the present invention.

A portion of the results of this study are shown in FIG. 8 which illustrates the reach of the two embodiments of the manipulators as a function of reach, R and vertical distance, Z. The reach of manipulator 10, with the joints as shown in these figures, is illustrated by curve 62. The other case which was studied in which the universal and ball joints were exchanged, is shown by curve 64. (The link lengths in nominal units for curves 62, 64 are, respectively—link 38: 0.798, 0.902; link 48: 1.041, 0.917; link 50: 0.728, 0.838; link 54 (between joints): 1.231, 1.013; link 54 (between joint 58 and gripper 60): 1.009, 0.943; offset of gripper from link 54: −0.600, −0.589. Axes 26 and 46 are assumed to be coincident.) The ideal volume covered is the torus obtained by rotating the cross-sectional plot of FIG. 8 about the z axis. The volume is symmetric with respect to the plane of z=0 as identified by the reach axis, R. This, of course, is an ideal situation which ignores physical barriers such as the base and assumes the vertical axes of the two actuator assemblies are coincident. However, it will be appreciated that a substantial volume of space may be reached with the specific manipulators described.

Additional mechanisms of the class illustrated above can be made by mounting motor 42 with a single-DOF mounting, such as the pin mounting 66, shown in FIG. 6 which provides for pivoting of motor 42 about axis 68. Alternatively, motor 42 may be mounted on a double pin or universal mounting 70 for rotation about a first horizontal axis 72 and an orthogonal horizontal axis 74, as shown. It will be seen that these alternative embodiments add 1 and 2 DOF, respectively to the joint represented by actuator assembly 16. This means that for each case, the number of constraints provided by joints 52, 56, 58 can be 1 and 2 constraints more, respectively, than described previously. Thus, when mounting 66 is used, joints 52, 56, 58 need to provide 13 constraints in order to result in 3 DOF manipulation of gripper 60. This simplifies the link joints since two of them can be pin joints, and one a ball or 3 DOF joint, or two of them universal joints, and one a pin joint. Similarly, with universal mounting 70, these three joints must provide 14 constraints. Thus, in this latter case, two of the joints can be a simple pin joint, and one of them a universal joint.

It will be appreciated that there is large variety of configurations in which a manipulator made according to the present invention may be provided.

Such manipulators all have three actuators mounted to the base and power is transmitted via five links, including the base link. The link connections consist of a differential with two drive motors, a single-drive motor, a universal joint, a ball joint and a pin joint. Other equivalent forms of joints can be provided as has been described. Since the actuators are fixed to the support structure their weight is not supported by the arm. Thus, very large heavy actuators capable of outputting both high speeds and high torques can be used while maintaining a relatively low inertia structure. This gives the arm high speed, acceleration and lift capabilities. The kinematic configuration, which avoids any cables, metal tapes, belts or bands, allows the design to utilize components with very high mechanical stiffness. With the mass of the motors removed, additional mass can be added to the structure to increase the stiffness while still maintaining a lower inertia than conventional designs. The differential gear is located in a particularly low inertia position so that its mass adds little to the structural inertia. Additionally, the closed chain kinematic structure with two separate ties to ground is inherently more accurate than an open chain structure with only one tie to ground.

It will therefore be understood by those skilled in the art that various changes in form and detail may be made therein without departing from the spirit and scope of the invention as defined in the claims.

What is claimed is:

1. A robotic manipulator comprising:
   a frame;
   a first input link;
   a first actuator assembly coupled at a first joint to one end of said first input link for manipulating said first link with two degrees of freedom;
   a second input link;
   a second actuator assembly coupled at a second joint to one end of said second link for manipulating said second link with one degree of freedom;
   means for mounting said first and second actuator assemblies on said frame;
   a first output link coupled at a third joint adjacent one of its ends to the other end of said first input link;
   a second output link coupled at a fourth joint at one of its ends to the other end of said second input link and coupled at a fifth joint at its other end to the other end of the first output link;
   where the mounting of said actuator assemblies on said frame, and said first through fifth joints allow manipulation of said one end of said first output link by said first and second actuator assemblies with three degrees of freedom.

2. A manipulator according to claim 1 wherein said third joint provides three degrees of freedom of relative movement, said fifth joint provides two degrees of freedom of relative movement, and said fourth joint provides one degree of freedom of relative movement.

3. A manipulator according to claim 2 wherein said first actuator assembly rotates said first input link about first and second relatively transverse axes, and said second actuator assembly rotates said second input link about a third axis.

4. A manipulator according to claim 1 wherein said first actuator assembly comprises a pair of coaxial motors with drive shafts and bevel gears attached to said motor drive shafts and to said first input link for rotating this link about said first axis when said pair of motors rotate about said first axis in the same direction and at the same speed, and for rotating this link about said second axis when said pair of motors rotate about said first axis in opposite directions at the same speed.

5. A manipulator according to claim 1 wherein said mounting means mounts said first and second actuator assemblies fixedly to said frame at spaced apart locations thereon.

6. A robot manipulator having three degrees of freedom comprising:
   a frame;
   a first actuator assembly fixedly mounted relative to said frame for providing rotational drive relative to said frame about a first axis and about a second axis disposed transverse to and intersecting said first axis whereby rotational drive about said first axis changes the location of said second axis relative to said first axis;
   a second actuator assembly fixedly mounted relative to said frame for providing rotational drive relative to said frame about a third axis;
   a first output link;
   a first input link fixedly coupled at one end to said first actuator assembly for rotation about said first and second axes, and at the other end said first output link in a manner allowing at least one degree of freedom of movement between said first output and first input links;
   a second input link fixedly connected at one end to said second drive means for relative rotation about said third axis;
   a second output link coupled at one end to the other end of said second input link, and coupled at its other end to said first output link, the junctions between said second input and first and second output links each allowing at least one degree of freedom of movement, with the three junctions between said first and second input and first and second output links allowing an average of two degrees of freedom of movement at each of said junctions.

7. A manipulator according to claim 6 wherein said first and second actuator assemblies are spaced apart from each other on said frame.

8. A manipulator according to claim 6 wherein the junction between said second input and second output links allows one degree of freedom of relative movement, the junction between said first and second output links allows two degrees of freedom of relative movement, and the junction between said first input and first output links allows three degrees of freedom of relative movement.

9. A manipulator according to claim 8 wherein said second actuator assembly is coupled to said second input link for rotating said second input link in a plane perpendicular to said first axis.

10. A manipulator according to claim 6 wherein said first actuator assembly comprises a pair of coaxial motors with motor drive shafts and bevel gears attached to said motor drive shafts and to said first input link for rotating said first input link about said first axis when said pair of motors rotate said drive shafts about said first axis, in the same direction and at the same speed, and for rotating said first input link about said second axis when said motor shafts are rotated about said first axis in opposite directions at the same speed.

11. A robotic manipulator having three degrees of freedom comprising:
   a frame;
   a first actuator assembly fixedly mounted on said frame for providing rotational drive relative to said frame about a first axis and about a second axis disposed in a plane perpendicular to and intersecting said first axis, whereby rotational drive about said first axis changes the location of said second axis in said plane;
   a second actuator assembly also fixedly mounted on said frame for providing rotational drive relative to said frame about a third axis parallel to said first axis;
   a first input link joined at one end to said first actuator assembly for rotation about said first and second axis;
   a second input link coupled to said second actuator assembly for rotation about said third axis;
   first and second output links;
   a one-degree-of-freedom joint joining one end of said second output link to the other end of said second input link;
   a three-degree-of-freedom joint joining said first output link to the other end of said first input link; and
   a two-degree-of-freedom joint joining the other end of said second output link to an end of said first output link providing two degrees of freedom between said first and second output links.

12. A manipulator according to claim 11, wherein said first actuator assembly comprises a pair of coaxial motors with motor drive shafts and bevel gears attached to said motor drive shafts and to said first input link for rotating said first input link about said first axis when said pair of motors rotate said drive shafts about said first axis, in the same direction and at the same speed, and for rotating said first input link about said second axis when said motor shafts are rotated about said first axis in opposite directions at the same speed.

* * * * *